Dec. 13, 1955   J. N. SAXTON   2,726,694
SINGLE SCREW ACTUATED PIVOTED CLAMP
Filed Feb. 4, 1952
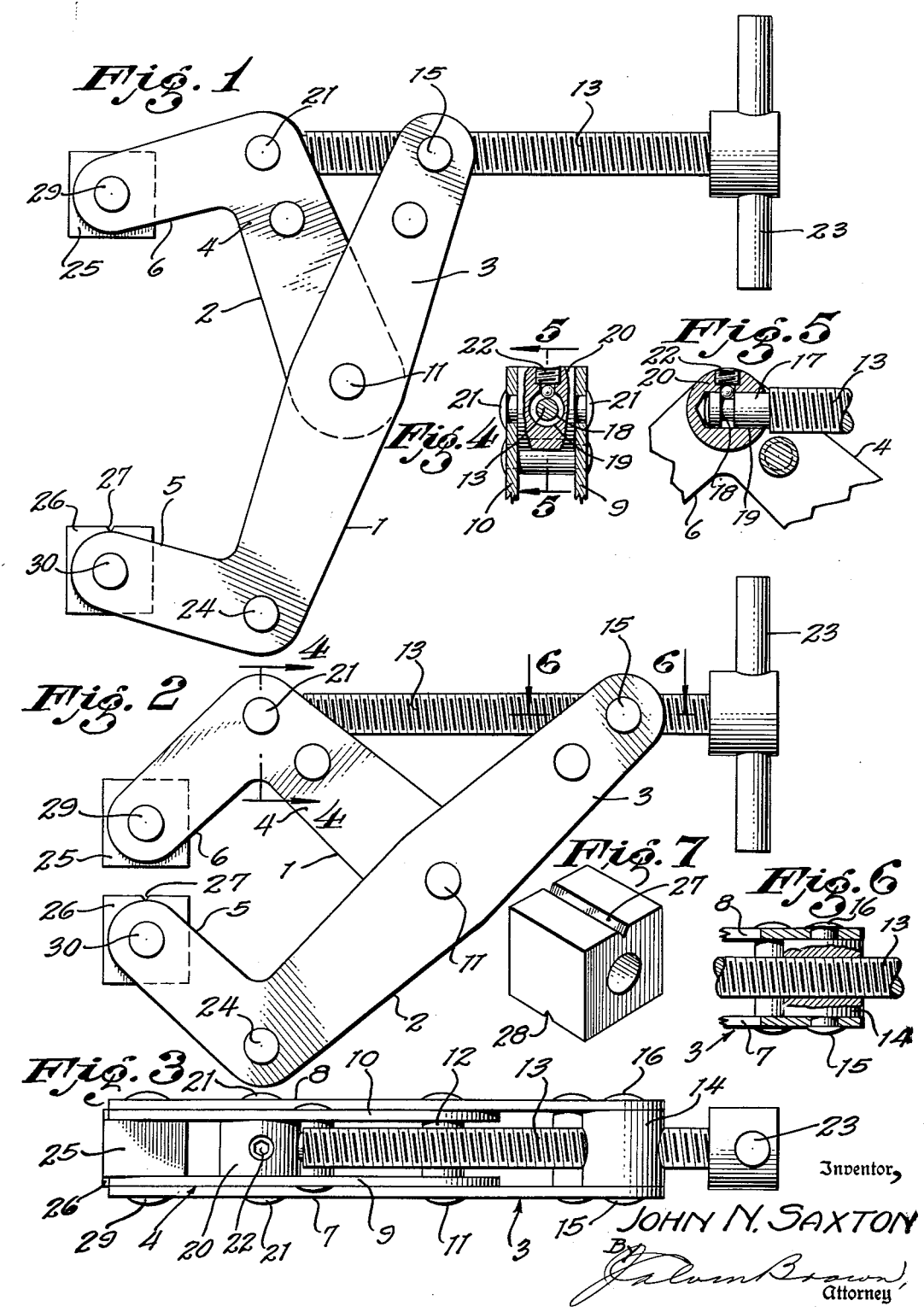
Inventor,
JOHN N. SAXTON
By
Calvin Brown
Attorney

United States Patent Office 2,726,694
Patented Dec. 13, 1955

2,726,694

SINGLE SCREW ACTUATED PIVOTED CLAMP

John N. Saxton, Baldwin Park, Calif.

Application February 4, 1952, Serial No. 269,755

2 Claims. (Cl. 144—302)

The present invention relates to clamps.

The average clamp usually has its operating members so related that the clamp is not easily positioned on work of different forms. The present clamp incorporates a thrust screw for operating a pair of jaws, the thrust screw at all times so moving the jaws as to avoid the work and not be impeded in its movement by the work. A small clamp of the present invention is capable of securing work between the jaws with a maximum compression and regardless of the position of the jaws.

An object of the invention is the provision of a clamp which is easily applied to work, of few parts, of great strength, foolproof in operation, and generally superior to clamps now known to the inventor.

In the drawings:

Fig. 1 is a side elevation of the clamp;

Fig. 2 is a view similar to Fig. 1, the jaws of the clamp being in moved position;

Fig. 3 is a top plan view of the clamp in the position shown in Fig. 2;

Fig. 4 is a fragmentary sectional view on the line 4—4 of Fig. 2;

Fig. 5 is a fragmentary sectional view on the line 5—5 of Fig. 4;

Fig. 6 is a fragmentary sectional view on the line 6—6 of Fig. 2; and

Fig. 7 is a perspective view on a jaw block.

Referring now with particularity to the drawing, I have provided a pair of members 1 and 2, of which 3 and 4 constitute arms and 5 and 6 jaws associated with the arms. Each member 1 and 2 is preferably formed of two spaced parts of identical form and maintained in substantial parallelism, as illustrated in Fig. 3 at 7, 8, 9 and 10. The pair of parts shown at 9 and 10 for the member 2 is secured by a pin 11 at its end between the parts 7 and 8 of the arm 3 and intermediate the ends of said arm 3. Preferably a spacer sleeve or bushing surrounds the pin 11 between the portions 9 and 10 at 12. As shown, the jaws 5 and 6 are substantially in right angular relationship to their respective arms 3 and 4 and an elongated thrust screw 13 is passed through a revoluble nut 14 pinned at 15 and 16 between the parts 7 and 8 of arm 3. The inner end of said thrust screw is provided with a coaxial reduced diameter extension 17, which extension is formed with an annular groove 18, with said extension received within bore 19 of a spacer block 20, pinned at 21 between the parts 9 and 10 of arm 4, and whereby said spacer block 20 may revolve between said parts. The spacer block is tapped to receive a screw or fitted pin 22 bearing against a ball in part received within groove 18 to hold the said reduced diameter extension 17 within said spacer block and for turning movement relative thereto. The outermost end of said thrust screw 13 carries a handle 23 of any form.

The bight portion of member 1 has its parts 7 and 8 separated by means of a sleeve or bushing held in place by a pin 24. Carried by the jaws 5 and 6 and interposed between the parts 9 and 10, and 7 and 8, respectively, are jaw blocks 25, 26. These blocks are parallelepipeds and the block 26 has one face provided with a transverse V-groove 27, while an opposite face is provided with a V-groove 28 in substantially right angular relationship to the groove 27, the other faces being plane. The jaw blocks are swingingly mounted to their respective jaws by means of pins 29 and 30.

The operation, uses and advantages of the clamp just described are as follows:

One size clamp of the invention is substantially that shown in the drawing by Figures 1 and 2, and wherein it will be observed that the two jaws are capable of separation to an extent substantially equal to the length of the arm 3, or the jaws may be brought together as shown in Figure 2. The arm length between the pin points shown at 24 and 15 is approximately 4½ inches, whereby this clamp is capable of engaging and holding work of considerable thickness. As the clamp is easily handled, due to its compact nature, it readily lends itself to securing work of different sizes and at places ordinarily difficult of access. It is to be observed that the thrust screw 13 at all times moves substantially parallel to the plane bisecting the space between the jaws and including the axis of the pivot pin 11. Thus, when the blocks are engaging work, the thrust screw is parallel to said faces, under the assumption that the work engaging faces of said blocks are parallel, and regardless of separation or approach of the jaws 5 and 6, as seen in Fig. 2. This method of moving the jaws assures that the thrust screw is at all times out of the way of the work engaged. Furthermore, the thrust screw by operating at the end of the arm 3 and at the bight portion between arm 4 and jaw 6 assures a proper leverage for moving the respective jaws into work engagement and under any desired compression. Hence the jaws may tightly engage the work, whether the jaws are nearly closed or at the point of greatest separation.

I claim:

1. A clamp including a pair of opposed clamping members, each member including an arm portion and a jaw portion at a sharp right angle to said arm portion, the arm portion of one member being substantially twice the length of the arm portion of the other member, means pivotally connecting the terminal of the shorter arm portion at a point intermediate the length of the longer arm portion, said longer arm portion terminating in spaced relation to the apex of the other right angular arm and jaw portion in a straight line parallel to the plane bisecting the space between the jaws and including the axis of the pivotal connection of the arms, a trunnion nut carried by said extremity, a single operating elongated thrust screw for the arms and jaws carried by the trunnion nut, and the inner end of said thrust screw having a swivel connection with the apex of the shorter arm and jaw and movable at all times in a straight line at a right angle to the movement of the jaws whereby said straight line movement imposes an equal pressure thrust upon each jaw due to the leverage obtained by the single screw.

2. The device set forth in claim 1 characterized in that: the arm and jaw of each member comprises two spaced parallel parts.

References Cited in the file of this patent

UNITED STATES PATENTS

| | | |
|---|---|---|
| 710,544 | Wandell | Oct. 7, 1902 |
| 970,568 | Starrett | Sept. 20, 1910 |
| 1,321,208 | Hinnershitz | Nov. 11, 1919 |
| 1,322,370 | Strathern | Nov. 18, 1919 |
| 1,515,286 | Svebilius | Nov. 11, 1924 |
| 2,374,899 | Sasgen | May 1, 1945 |